Figure 1:
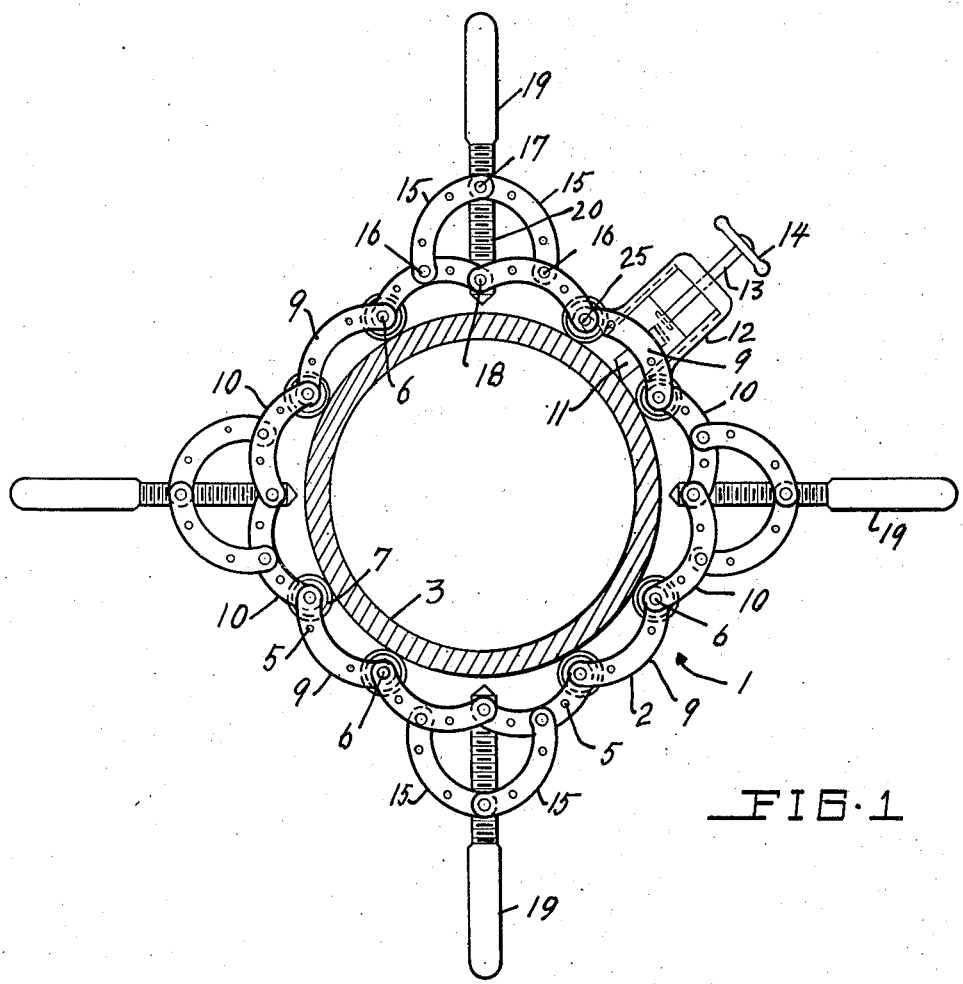

Dec. 30, 1947.   J. B. GILL ET AL   2,433,606
PIPE CUTTING TOOL
Filed Feb. 19, 1945   2 Sheets-Sheet 1

INVENTORS
John B. Gill
BY Leonard C. Schomer

A. Schapp
ATTORNEY

Dec. 30, 1947.　　　J. B. GILL ET AL　　　2,433,606
PIPE CUTTING TOOL
Filed Feb. 19, 1945　　　2 Sheets-Sheet 2
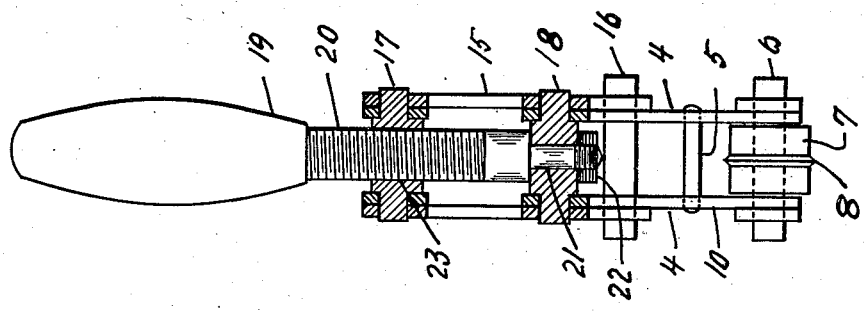
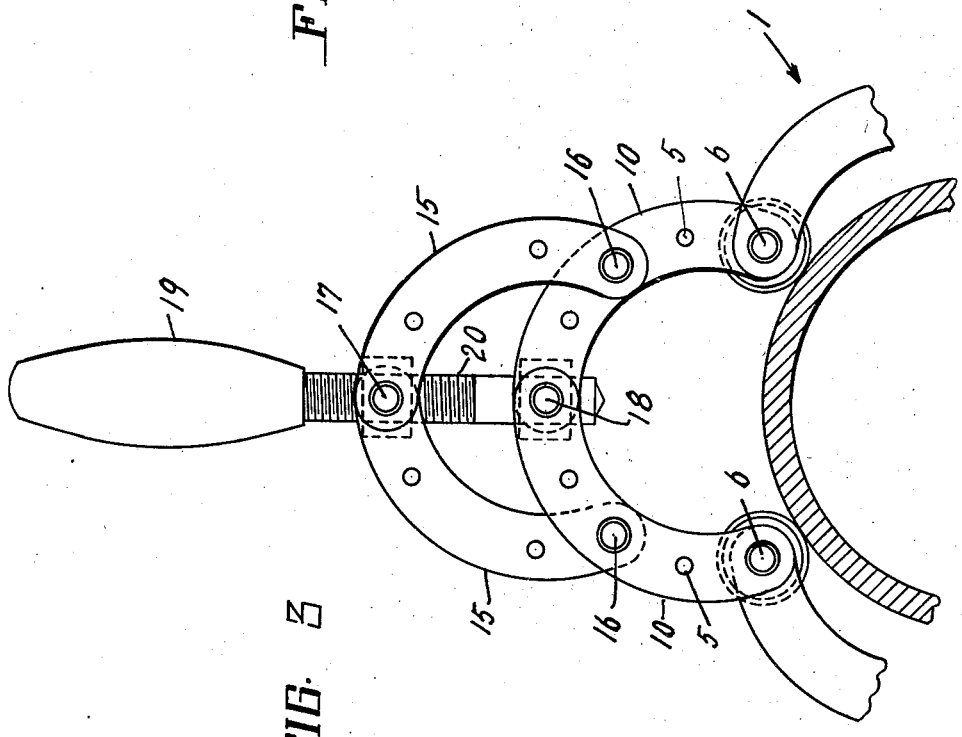
INVENTORS
John B. Gill
Leonard C. Schomer
BY
A. Schapp
ATTORNEY Patented Dec. 30, 1947

2,433,606

UNITED STATES PATENT OFFICE 2,433,606

PIPE CUTTING TOOL

John B. Gill, San Francisco, and Leonard C. Schomer, Fresno, Calif., assignors to Pilot Manufacturing Company, San Francisco, Calif., a co-partnership Application February 19, 1945, Serial No. 578,649

2 Claims. (Cl. 30—100)

The present invention relates to improvements in a pipe cutting tool, and comprises certain improvements over a tool of the character described in application, Serial Number 535,958, filed by Telford L. Smith and John B. Gill, as joint inventors, now issued into Patent No. 2,381,156, granted on August 7, 1945.

In the latter application it was proposed to provide a pipe cutting tool employing a plurality of arcuate links joined to form a chain adapted to wrap around a pipe to be cut, to provide means cooperating with any suitable pair of adjacent links for drawing the intervening joint away from the pipe and for drawing the two outer joints together, whereby the two links were made to form an arc over the pipe, and whereby the overall length of the chain was reduced.

In the pending application it was proposed to use a reversely threaded rod for adjusting the spacing between the two adjacent links.

In the present application it is proposed to provide a novel control means for adjusting the spacing between adjacent links, the principal advantage of the new control means being that it provides a wider range of adjustment, allowing the two control links to yield the full length of both links around the circumference, if fully extended. On the other hand, it allows the two control links to be contracted so as to be substantially confined in their overall length to the normal length of a single link.

Our new control means also makes it possible to use the control member as a handle for revolving the chain about the pipe, because the control member is arranged in radial direction.

The new control means is intended to increase the range of each individual tool, by insertion or removal of individual links or of linked pairs, and, in fact, a few basic tools will cover the entire range of pipes usually encountered in work of this character.

And finally, our new control means readily adapts itself to the use of a plurality of paired links in a single chain, with control members radiating in opposing relation, like the control handles of a pilot wheel, which makes the chain relatively easy to operate even where many links are employed and the tool is made to cut a pipe of large size.

Further objects and advantages of our invention will appear as the specification proceeds, and the novel features of the invention will be fully defined in the claims hereto attached.

Figure 2:
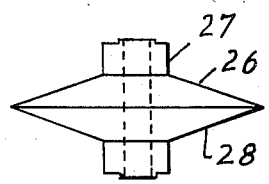

The preferred form of our invention is illustrated in the accompanying drawing, forming part of this application, in which:

Figure 1 shows a side view of a pipe cutting tool of many links arranged around a pipe of large diameter;

Figure 2, a detail view of a cutting wheel which may be substituted for certain roller guides where the use of the cutting wheel is desirable;

Figure 3, an enlarged detail view, in side elevation, of a portion of the tool shown in Figure 2; and Figure 4, a transverse section through the form shown in Figure 3.

While we have shown only the preferred forms of our invention, it should be understood that various changes or modifications may be made within the scope of the claims hereto attached without departing from the spirit of the invention.

Referring to the drawing in detail, and particularly to Figure 1, our pipe cutting tool comprises a chain 1 made up of a plurality of links 2. These links are made arcuate in form and drawn to a diameter which may conform to the smallest diameter pipe for which the tool is intended. They curve away from large pipes, as, for instance, the pipe 3 shown in the drawing, and this has the advantage of providing clearance for the removed material.

Each of the links 2 comprises two plates 4 arranged in spaced and parallel relation and held in position by the use of suitable spacing members 5.

The links are interconnected by means of pivots 6, and these pivots serve as bearings for guide rollers 7 which project inwardly beyond the links so as to contact the pipe surface.

The rollers may be made substantially in the same form as illustrated in the co-pending application, of considerable width so as to offer a large riding surface, and provided with a central tapering rib 8 adapted to follow the kerf made by the cutter to prevent travelling of the chain lengthwise of the pipe and to keep the chain to a true course.

All the links used in our chain are made substantially of the same form and are interchangeable.

The chain shown is intended for use in connection with a relatively large pipe, say about twelve inches in nominal diameter and the links shown may be divided into two classes, one comprising four single links 9, and the other four sets of double links 10, making twelve links in all. The chain is preferably designed to contain one link for each inch of nominal pipe diameter.

Any one of the single links and any set of double links may be readily removed from the chain to lessen the overall length of the latter and to make the same adaptable for use in connection with pipes of smaller diameters, down to three inch pipes.

One of the single links may be used as a carrier for the cutter 11. The latter may be of any suitable form and may substantially correspond to the cutter conventionally used in lathe operations.

The lathe cutter 11 is mounted in a yoke 12, and may be fed, for deepening the cut in successive revolutions, by means of a threaded rod 13 engaging in the cross-member of the yoke and provided with a handle 14.

The cutter is preferably made of substantially the same width as the tapered rib 8 on the guide rollers and is mounted in the same transverse plane so that the guide roller ribs will ride in the kerf of the cutter and keep the whole chain to a true course.

The four sets of double links 10 are used to adjust a chain of a given length to the circumference of the pipe and to deepen the engagement of the rollers on successive revolutions. They may be contracted and expanded to accomplish this purpose. With this object in mind, we provide, in connection with each set of chain links, a pair of auxiliary links 15, which are superimposed on the chain links to project outwardly therefrom.

The auxiliary links are pivoted to the chain links, intermediate the lengths thereof, as at 16, and are pivoted to one another, as at 17. The latter pivot is positioned in radial alinement with the pivot 18 between the chain links. The two pivots 17 and 18 are of special construction for operation by the handle 19 which has a threaded inner end, as at 20.

The pivot 18 is formed with a radial bore 21 adapted to revolvably receive the reduced inner end of the handle 19, which is held against axial movement by a nut 22. The pivot 17 is provided with a threaded bore 23 adapted to receive the threaded portion of handle 19. Thus, the spacing between the pivots 17 and 18 may be changed at will by turning the handle 19.

When the handle is turned in one direction, the pivot 18 is drawn away from the surface of the pipe, causing the outer ends of the links 10 to move toward one another, and to thus shorten the overall length of the chain, as indicated in Figure 3.

It will be noted that this shortening movement may be executed at least to a degree where the overall length of the two links on the circumference of the pipe is practically reduced to that of a single link. On the other hand, the reverse movement may be carried sufficiently far to bring the full length of the two links into play, as shown in Figure 1.

The handle 19 extends beyond the threaded portion in radial direction to serve as a manipulating means for turning the chain about the pipe. In the form shown, four of these radial handles are provided in uniform spacing, and they give to the entire tool the appearance of a pilot wheel and allow the tool to be operated substantially in the same manner in which a pilot wheel is operated.

Any suitable coupling means may be provided, as at 25, to connect and disconnect the two end links of the chain, and this coupling should preferably be positioned at the pivot following the cutter 11.

In use, the chain is first adjusted, by removal of the single links, to the approximate size of the pipe to be cut. It is then wrapped around the pipe and secured at the coupling 25. Next the chain is tightened around the pipe by operation of the handles 19 to press the ribs 8 into contact with the pipe. The cutter 11 is similarly adjusted to contact the pipe.

The chain is then turned about the pipe by use of the handles 19, each handle being turned slightly while being gripped, for deepening the engagement. The cutter thus cuts a kerf in the pipe material and the ribs of the guide rollers follow the kerf and keep the chain to its course.

After the kerf has reached a depth equal to the height of the rib, the latter will fully engage in the kerf and the cylindrical portion of the rollers will ride on the pipe. The chain now cannot be tightened any further, but is firmly held against endwise movement of the pipe by the ribs 7 fully engaging in the kerf. Cutting action may be continued by gradual deepening of the cutter blade through operation of the handle 14.

In case it is desired to dispense with the lathe cutter 11, a cutting wheel 26, shown in Figure 2, may be substituted for the guide rollers previously described. This cutting wheel comprises a hub 27 and a rib 28. The latter is made much deeper than the one on roller 7 and has a case-hardened knife edge, so as to cut through the pipe material upon proper manipulation of the tool.

We claim:

1. In a pipe cutting tool of the character described, a chain adapted for placing around a pipe and comprising a plurality of arcuate links having pivotal joints connecting the same, two auxiliary links pivoted to two adjacent chain links intermediate the lengths thereof and being connected together by a hinge joint, the latter joint being in radial alinement with the joint between the two adjacent chain links, and a radial handle revolvably held in one of the last-mentioned joints and threadedly in the other, whereby the spacing between the two joints may be adjusted for spreading or contracting the adjacent chain links.

2. In a pipe cutting tool of the character described, a chain adapted for placing around a pipe and comprising a plurality of arcuate links having pivotal joints connecting the same, two auxiliary links pivoted to two adjacent chain links intermediate the lengths thereof and being connected together by a hinge joint, the latter joint being in radial alinement with the joint between the two adjacent chain links, and a radial handle revolvably held in one of the last-mentioned joints and threadedly in the other, whereby the spacing between the two joints may be adjusted for spreading or contracting the adjacent chain links, the handle projecting radially beyond the two joints to serve as a manipulating member for revolving the chain about the pipe.

JOHN B. GILL.
LEONARD C. SCHOMER.

REFERENCES CITED

The following references are of record in the file of this patent:

UNITED STATES PATENTS

| Number | Name | Date |
| --- | --- | --- |
| 553,663 | Anderson | Jan. 28, 1896 |